United States Patent
Agarwal et al.

(10) Patent No.: US 10,379,835 B2
(45) Date of Patent: *Aug. 13, 2019

(54) OPTIMIZED CREATION OF DISTRIBUTED STORAGE AND DISTRIBUTED PROCESSING CLUSTERS ON DEMAND

(71) Applicant: International Business Machines Corporation, Armonk, NY (US)

(72) Inventors: Anjali Agarwal, Kolkata (IN); Rachit Arora, Bangalore (IN); Deepashree Gandhi, Bangalore (IN); Dharmesh K. Jain, Bangalore (IN); Shrinivas S. Kulkarni, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 15/383,530

(22) Filed: Dec. 19, 2016

(65) Prior Publication Data
US 2018/0173512 A1 Jun. 21, 2018

(51) Int. Cl.
*G06F 8/61* (2018.01)
*H04L 29/08* (2006.01)
*G06F 16/182* (2019.01)

(52) U.S. Cl.
CPC .............. *G06F 8/63* (2013.01); *G06F 16/182* (2019.01); *G06F 16/183* (2019.01); *H04L 67/1097* (2013.01); *H04L 67/34* (2013.01)

(58) Field of Classification Search
CPC ..... G06F 8/63; G06F 17/30203; H04L 67/34; H04L 67/1097
(Continued)

(56) References Cited

U.S. PATENT DOCUMENTS 6,262,726 B1* 7/2001 Stedman ................ G06F 9/451
717/174
6,952,737 B1* 10/2005 Coates ................. G06F 3/0607
709/229

(Continued)

OTHER PUBLICATIONS

Shi et al., "A Cloud Service Cache System Based on Memory Template of Virtual Machine", 2011, IEEE (Year: 2011).*

(Continued)

*Primary Examiner* — Wei Y Zhen
*Assistant Examiner* — Junchun Wu
(74) *Attorney, Agent, or Firm* — Stephen R. Tkacs; Stephen J. Walder; Robert C. Bunker (57) ABSTRACT

A mechanism is provided in a data processing system for creating clusters on demand. The mechanism installs a cluster on the data processing system. The cluster comprises a master node and a managed node having distributed software installed thereon. The mechanism stores state of cluster on external volumes and removes references specific to the cluster from the state of the cluster stored on the external volumes. The mechanism takes a snapshot of the state of the cluster stored on the external volumes to form a set of volume templates and takes a snapshot of images of the master node and the managed node to form a set of node type images. Responsive to receiving a request to create a specified cluster, the mechanism creates a new set of nodes on the data processing system based on the set of node type images, clones the set of volume templates to form a new set of volumes in the data processing system, mounts the new set of volumes to the new set of nodes, and recreates configurations based on details in the request.

10 Claims, 5 Drawing Sheets

(58) Field of Classification Search
USPC .......................................................... 717/175
See application file for complete search history.

(56) References Cited

U.S. PATENT DOCUMENTS

| | | | | |
|---|---|---|---|---|
| 6,996,588 | B2* | 2/2006 | Azagury | G06F 8/61 |
| 7,000,231 | B1* | 2/2006 | Gold | G06F 8/63 |
| | | | | 717/175 |
| 7,069,270 | B1* | 6/2006 | Kumar | G06F 9/44505 |
| | | | | 717/171 |
| 7,562,078 | B1* | 7/2009 | Yadav | G06F 16/10 |
| 8,108,855 | B2* | 1/2012 | Dias | G06F 9/5077 |
| | | | | 717/176 |
| 8,122,107 | B2* | 2/2012 | Bonar | G06F 8/35 |
| | | | | 709/208 |
| 9,152,402 | B2* | 10/2015 | Scheidel | G06F 8/61 |
| 9,342,557 | B2 | 5/2016 | Kornacker et al. | |
| 9,578,088 | B2* | 2/2017 | Nickolov | G06F 9/4856 |
| 9,619,257 | B1* | 4/2017 | Aron | G06F 9/45533 |
| 2005/0262143 | A1* | 11/2005 | Rao | G06F 9/5061 |
| | | | | 709/204 |
| 2007/0233698 | A1* | 10/2007 | Sundar | G06F 8/60 |
| 2008/0244028 | A1* | 10/2008 | Le | G06F 3/0607 |
| | | | | 709/208 |
| 2008/0271016 | A1* | 10/2008 | Chess | G06F 8/63 |
| | | | | 718/1 |
| 2010/0169881 | A1* | 7/2010 | Silvera | G06F 8/63 |
| | | | | 718/1 |
| 2013/0167139 | A1* | 6/2013 | Arcilla | G06F 21/57 |
| | | | | 717/175 |
| 2013/0227558 | A1* | 8/2013 | Du | G06F 9/45558 |
| | | | | 718/1 |
| 2014/0055496 | A1 | 2/2014 | Cunningham et al. | |
| 2015/0120887 | A1* | 4/2015 | Hu | G06F 8/61 |
| | | | | 709/220 |
| 2015/0261580 | A1 | 9/2015 | Shau et al. | |
| 2015/0347165 | A1* | 12/2015 | Lipchuk | G06F 8/63 |
| | | | | 718/1 |
| 2016/0034290 | A1* | 2/2016 | Christenson | G06F 9/45558 |
| | | | | 718/1 |
| 2016/0162510 | A1* | 6/2016 | Hildebrand | G06F 16/178 |
| | | | | 707/634 |
| 2016/0173603 | A1* | 6/2016 | Ainscow | G06F 3/06 |
| | | | | 707/827 |
| 2016/0364406 | A1* | 12/2016 | Brown | G06F 16/183 |

OTHER PUBLICATIONS

Jiang Et al., "Inventory-based Resource Management in Cloud Computing", 2011 IEEE (Year: 2011).*
Aldinucci et al., "The VirtuaLinux Storage Abstraction Layer for Efficient Virtual Clustering", 2008, IEEE (Year: 2008).*
Mao et al., "Towards Deploying Elastic Hadoop in the Cloud", 2011, IEEE (Year: 2011).*
Ma et al. "TVMCM: A Trusted VM Clone Model in Cloud Computing", Jun. 2013, IEEE (Year: 2013).*
Shi et al., "VNIX: Managing Virtual Machines on Clusters", 2008, IEEE (Year: 2008).*
List of IBM Patents or Patent Applications Treated as Related, Jan. 23, 2018, 2 pages.
Zhang, Zhaoning et al., "VMThunder: Fast Provisioning of Large-Scale Virtual Machine Clusters", IEEE Transactions on Parallel and Distributed Systems, vol. 25, No. 12, Dec. 2014, pp. 3328-3338.

* cited by examiner

OPTIMIZED CREATION OF DISTRIBUTED STORAGE AND DISTRIBUTED PROCESSING CLUSTERS ON DEMAND

BACKGROUND

The present application relates generally to an improved data processing apparatus and method and more specifically to mechanisms for optimized creation of distributed storage and distributed processing clusters on demand.

Apache Hadoop is an open-source software framework for distributed storage and distributed processing of very large data sets on computer clusters built from commodity hardware. All the modules in Hadoop are designed with a fundamental assumption that hardware failures are common and should be automatically handled by the framework. The core of Apache Hadoop consists of a storage part, known as Hadoop Distributed File System (HDFS), and a processing part called MapReduce. Hadoop splits files into large blocks and distributes them across nodes in a cluster. To process data, Hadoop transfers packaged code for nodes to process in parallel based on the data that needs to be processed. This approach takes advantage of data locality—nodes manipulating the data, to which they have access—to allow the dataset to be processed faster and more efficiently than it would in a more conventional supercomputer architecture that relies on a parallel file system where computation and data are distributed via high-speed networking.

The base Apache Hadoop framework is composed of the following modules:
- Hadoop Common—contains libraries and utilities needed by other Hadoop modules;
- Hadoop Distributed File System (HDFS)—a distributed file-system that stores data on commodity machines, providing very high aggregate bandwidth across the cluster;
- Hadoop YARN—a resource-management platform responsible for managing computing resources in clusters and using them for scheduling of users' applications; and
- Hadoop MapReduce—an implementation of the Map Reduce programming model for large scale data processing.

A clustered file system is a file system that is shared by being simultaneously mounted on multiple servers, There are several approaches to clustering, most of which do not employ a clustered file system, only direct attached, storage for each node. Clustered file systems can provide features like location-independent addressing and redundancy, which improve reliability or reduce the complexity of the other parts of the cluster. Parallel file systems are a type of clustered file system that spread data across multiple storage nodes, usually for redundancy or performance.

Distributed file systems do not share block level access to the same storage but use a network protocol. These are commonly known as network file systems, even though they are not the only file systems that use the network to send data, Distributed file systems can restrict access to the file system depending on access lists or capabilities on both the servers and the clients, depending on how the protocol is designed.

A distributed computing system is a model in which components located on networked computers communicate and coordinate their actions by passing messages. The components interact with each other in order to achieve a common goal, Three significant characteristics of distributed systems are: concurrency of components, lack of a global clock, and independent failure of components. Examples of distributed systems vary from SOA-based systems to massively multiplayer online games to peer-to-peer applications.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, for creating clusters of containers on demand. The method comprises installing a cluster on the data processing system, the cluster comprising one or more master/manager nodes and one or more managed nodes like data nodes. The method further comprises storing state of cluster on external volumes and removing references specific to the cluster from the state of the cluster stored on the external volumes. The method further comprises taking a snapshot of the state of the cluster stored on the external volumes to form a set of volume templates and taking a snapshot of images of the master node and the managed node to form a set of node type images. The method further comprises, responsive to receiving a request to create a specified cluster, creating a new set of nodes on the data processing system based on the set of node type images, cloning the set of volume templates to form a new set of volumes in the data processing system, mounting the new set of volumes to the new set of nodes, and recreating configurations based on details in the request.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

A Hadoop cluster consists of multiple machines. Typically, it takes a long duration of time to create a Hadoop cluster—anywhere from hours for a small cluster to weeks for a large cluster. When Hadoop is offered as a cloud service, it is imperative to provision a cluster quickly and not let a customer wait for a lengthy period of time. Also, in a cloud environment that provides a managed. Hadoop cluster the hosting company is responsible for availability, maintenance, and frequent patch management with least down time.

The illustrative embodiments provide mechanisms for creating large Hadoop clusters in a short period of time. In order to successfully install a cluster in a short period of time, the illustrative embodiments provide a mechanism for separating installed binaries from state of the cluster. Upfront binaries are built into virtual machine images, and state of the cluster is externalized in volume templates. During cluster creation time, pre-built virtual machines with required binaries and pre-populated state are used to assemble the cluster on the fly. As used herein, the term "virtual machine" refers to a virtual machine or cloud compute instance or a Linux™ container like Docker™ container, as will be described in further detail below. With this approach, Hadoop clusters can be created on demand in a highly reliable and consistent fashion. Because the binaries are pre-installed and there are very few activities to be performed during the cluster creation, the number of possible failures and the overall time to create the cluster are significantly reduced.

Before beginning the discussion of the various aspects of the illustrative embodiments, it should first be appreciated that throughout, this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation, Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
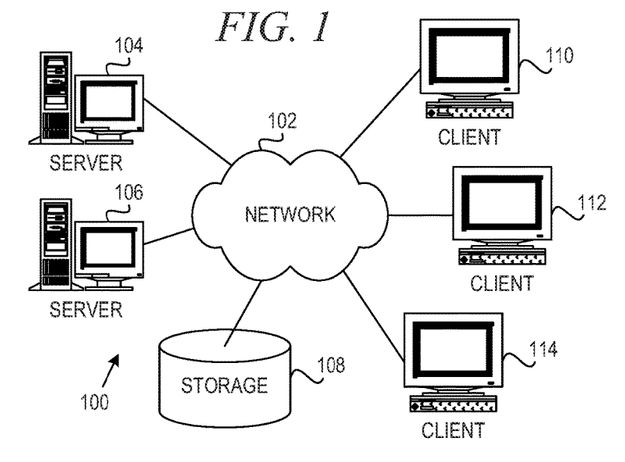
FIG. 1 is an example diagram of a distributed data processing system in which aspects of the illustrative embodiments may be implemented.
Figure 2:
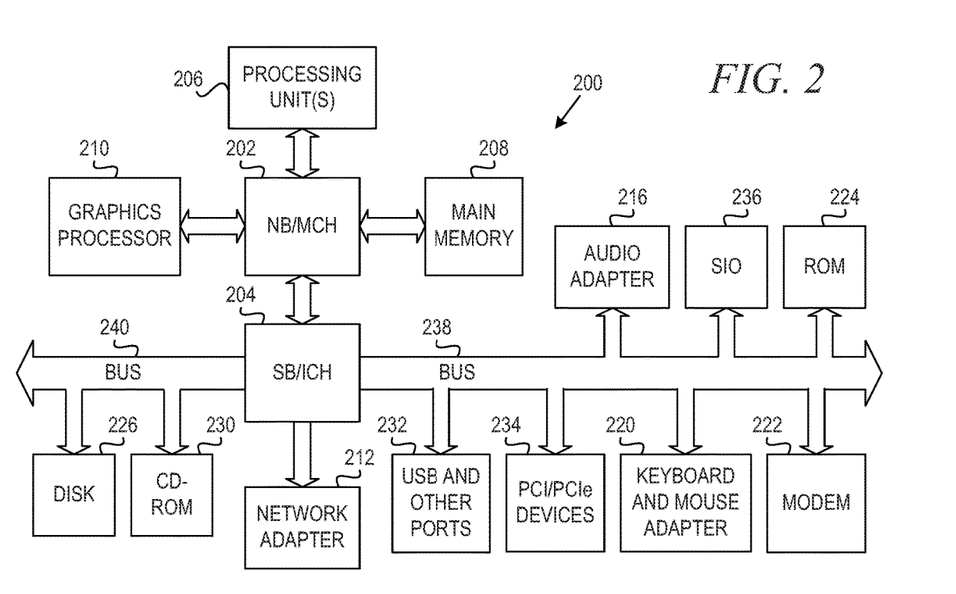
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example, Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a software framework for distributed storage and distributed processing of very large data sets on computer clusters built from commodity hardware. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates an optimized mechanism for creating clusters on demand on computing devices in the distributed data processing system 100.

These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202, Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240, PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the optimized mechanism for creating clusters on demand.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3A:
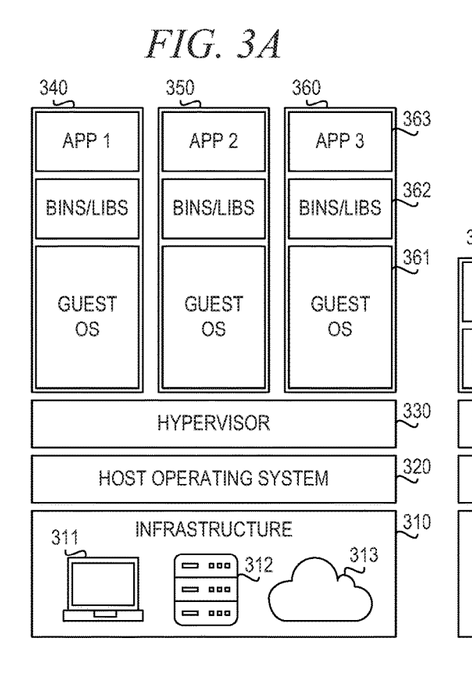
FIG. 3A depicts an example of a virtual machine environment in which aspects of the illustrative embodiments may be incorporated.

FIG. 3A depicts an example of a virtual machine environment in which aspects of the illustrative embodiments may be incorporated. A virtual machine (VM) is an emulation of a computer system. Virtual machines are based on computer architectures and provide functionality of a physical computer. Their implementations may involve specialized hardware, software, or a combination. There are different kinds of virtual machines, each with different functions:

System virtual machines (also termed full virtualization VMs) provide a substitute for a real machine. They provide functionality needed to execute entire operating systems. A hypervisor uses native execution to share and manage hardware, allowing for multiple environments which are isolated from one another, yet exist on the same physical machine. Modern hypervisors use hardware-assisted virtualization, virtualization-specific hardware, primarily from the host central processing units (CPUs).

Process virtual machines are designed to execute computer programs in a platform-independent environment.

Infrastructure 310 comprises computing resources including computing devices 311 (e.g., servers, processing units), storage systems 312 (e.g., hard disk drives), and networking resources 313 (e.g., network adapters). Host operating system 320 executes on infrastructure 310, and hypervisor 330 executes on operating system 320, Hypervisor 330 creates and manages virtual machines 340, 350, 360. As an example, virtual machine 360 runs a guest operating system (OS) 361, binaries and libraries 362, and an application (APP 3) 363. In accordance with the illustrative embodiments, virtual machines 340, 350, 360 have distributed software installed thereon, such as Hadoop software.

A hypervisor or virtual machine monitor (VMM) is a piece of computer software, firmware, or hardware that creates and runs virtual machines. A computer on which a hypervisor runs one or more virtual machines is called a host machine, and each virtual machine is called a guest machine. The hypervisor presents the guest operating systems (e.g., guest OS 361) with a virtual operating platform and manages the execution of the guest operating systems. Multiple instances of a variety of operating systems may share the virtualized hardware resources. This contrasts with operating-system-level virtualization, where all instances (usually called "containers") must share a single kernel, though the guest operating systems can differ in user space, such as different Linux™ distributions with the same kernel.

Figure 3B:
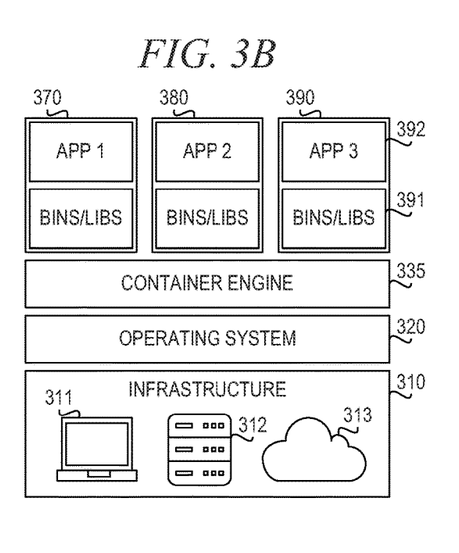
FIG. 3B depicts an example of a container environment in which aspects of the illustrative embodiments may be incorporated.

FIG. 3B depicts an example of a container environment in which aspects of the illustrative embodiments may be incorporated. As an example, Docker™ is an open-source project that automates the deployment of applications inside software containers. Docker™ containers wrap up a piece of software in a complete filesystem that contains everything it needs to run: code, runtime, system tools, system libraries—anything you can install on a server. This guarantees that it will always run the same, regardless of the environment in which it is running.

Similar to the virtual machine environment of FIG. 3A, infrastructure 310 comprises computing resources including computing devices 311 (e.g., servers, processing units), storage systems 312 (e.g., hard disk drives), and networking resources 313 (e.g., network adapters). Operating system 320 executes on infrastructure 310. In the container environment of FIG. 3B, container engine 335 executes on operating system 320. Container engine 335 creates and manages containers 370, 380, 390. Docker™ provides an additional layer of abstraction and automation of operating-system-level virtualization on the operating system 320. Docker™ uses the resource isolation features of the operating system kernel to allow independent "containers" 370, 380, 390 to run within a single operating system instance, avoiding the overhead of starting and maintaining virtual machines. In the depicted example, container 390 includes binaries and libraries 391, and an application (APP 3) 392, for instance. In accordance with the illustrative embodiments, containers 370, 380, 390 have distributed software installed thereon, such as Hadoop software.

The term "virtual node," as used herein, is a virtualized implementation of a node including binaries, libraries, and at least one application. In one embodiment, as shown in FIG. 3A, a virtual node may be a virtual machine (VM), which includes a guest operating system, binaries and libraries, and at least one application. In an alternative embodiment, as shown in FIG. 3B, a virtual node may be a container, which includes binaries, libraries, and at least one application.

Figure 4:
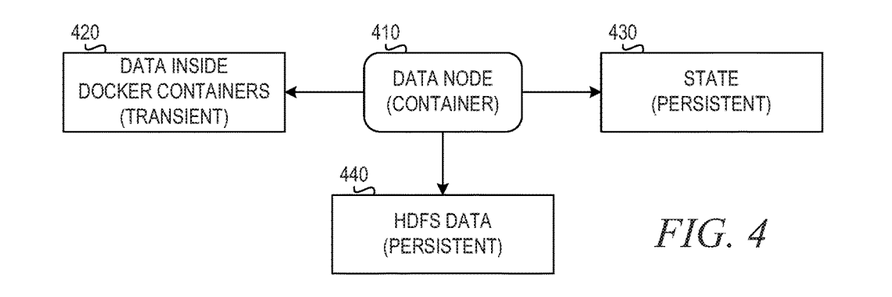
FIG. 4 is a block diagram depicting a Hadoop nodes as Docker containers in accordance with an illustrative embodiment.

FIG. 4 is a block diagram depicting Hadoop nodes as Docker™ containers in accordance with an illustrative embodiment. A Hadoop cluster comprises a plurality of nodes including one or more master nodes and one or more managed nodes. A data node is an example of a managed node. In the depicted example, data node 410 is a container with data inside the container 420, state 430, and Hadoop distributed file system (HEWS) data 440. The data inside the container 420 is transient, while the state 430 and HDFS data 440 are persistent.

Figure 5:
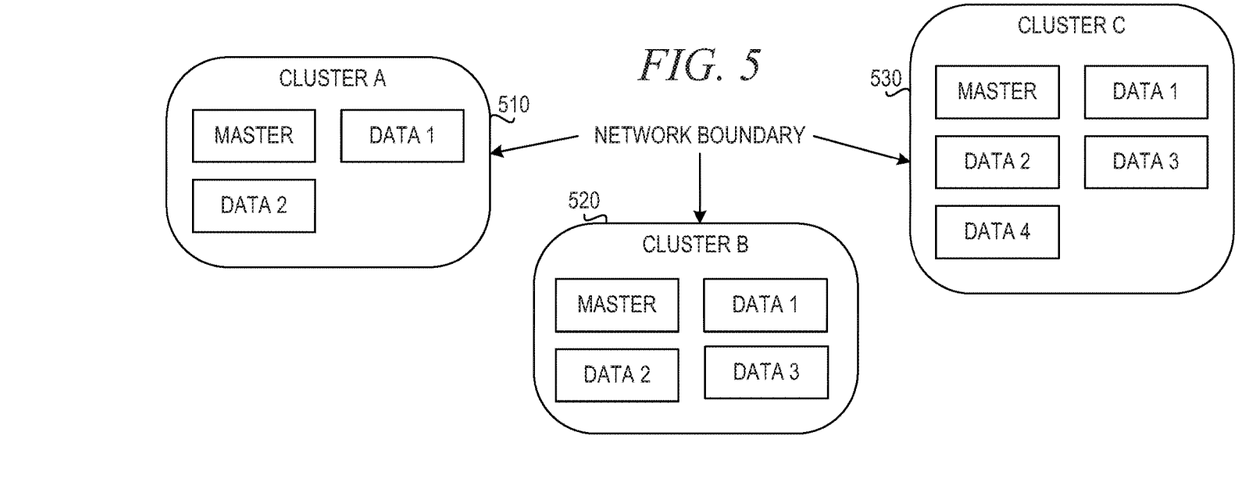
FIG. 5 depicts example clusters using containers in accordance with an illustrative embodiment.

FIG. 5 depicts example clusters using containers in accordance with an illustrative embodiment. In the depicted example, cluster A 510 includes one master node and two data nodes; cluster B 520 includes one master node and three data nodes; and, cluster C 530 includes one master node and four data nodes. Each cluster 510, 520, 530 has a respective network boundary. In accordance with the illustrative embodiment, each cluster node is a virtual node implemented as a container. Each cluster 510, 520, 530 has multiple nodes/containers spanning multiple hosts.

In one embodiment, the containers 510, 520, 530 run on a plurality of bare metal hosts. Bare machine (or bare metal), in computer parlance, means a computer without its operating system. Modern operating systems evolved through various stages, from elementary to the present-day complex, highly sensitive real-time systems. After the development of programmable computers, which did not require physical changes to run different programs, but prior to the development of operating systems, programs were fed to the computer system directly using machine language by the programmers without any system software support. This approach is termed the "bare machine" approach in the development of operating systems. Today it is mostly applicable to embedded systems and firmware, while everyday programs are run by a runtime system within an operating system. In this case, a bare metal host is a machine with an embedded operating system and container engine, such as by firmware.

Figure 6:
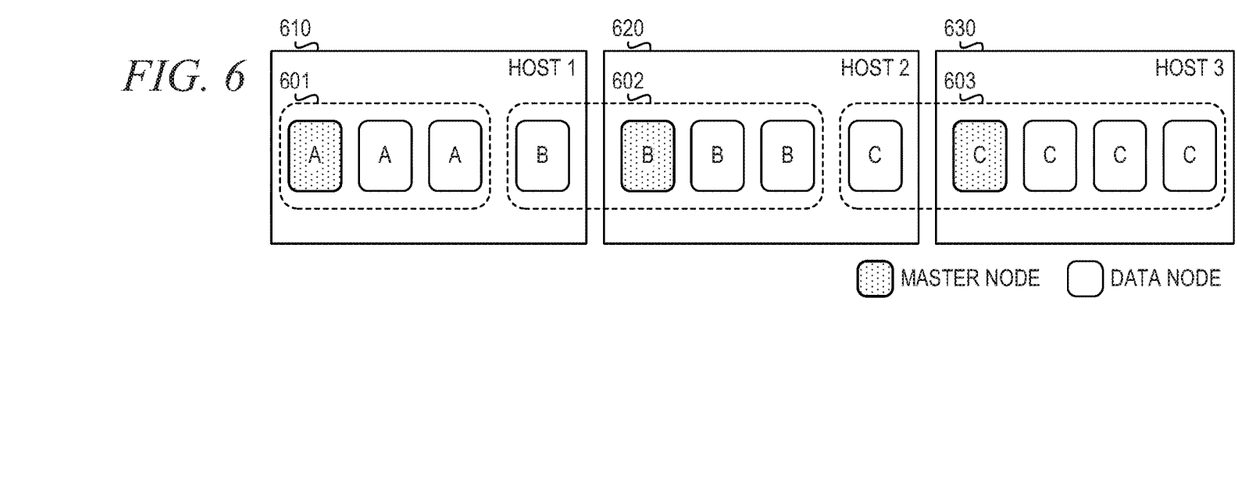
FIG. 6 is a block diagram depicting a plurality of clusters spanning a plurality of hosts in accordance with an illustrative embodiment.

FIG. 6 is a block diagram depicting a plurality of clusters spanning a plurality of hosts in accordance with an illustrative embodiment. Clusters 601, 602, 603 span hosts 610, 620, 630. Cluster A 601 includes a master node and two data nodes executing on host 1 610. Cluster B 602 includes a master node and two data nodes executing on host 2 620, as well as one data node executing on host 1 610. Cluster C 603 includes a master node and three data nodes executing on host 3 630, as well as one data node executing on host 2 620.

Figure 7:
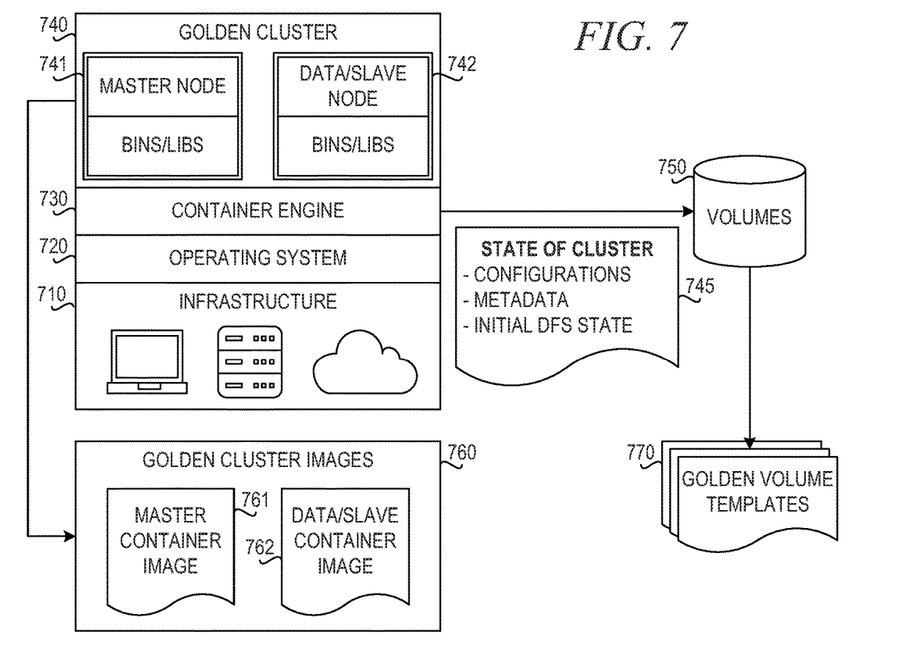
FIG. 7 is a block diagram illustrating a mechanism for creating templates and images for provisioning clusters on demand in accordance with an illustrative embodiment.

FIG. 7 is a block diagram illustrating a mechanism for creating templates and images for provisioning clusters on demand in accordance with an illustrative embodiment. Infrastructure 710 comprises computing resources including computing devices (e.g., servers, processing units), storage systems (e.g., hard disk drives), and networking resources (e.g., network adapters). Operating system 720 executes on infrastructure 710. In the container environment of FIG. 7, container engine 730 executes on operating system 720.

In accordance with an illustrative embodiment, the mechanism first installs a two-node cluster 740 with one master node 741 and one data/slave node 742 on two containers. This cluster 740 is referred to herein as the "golden cluster." While installing the golden cluster, the mechanism installs all required binaries and libraries on containers 741, 742.

The mechanism externalizes the state 745 of the cluster 740, which includes configurations, metadata, and initial state of the distributed file system. In one example embodiment, the mechanism runs Hadoop nodes in Docker™ containers. The container can crash at any time; hence, it is best practice to not keep any state information inside a container. By doing so, the mechanism can let the containers be stopped, restarted, or auto restarted without any worry. In other words, containers should be made re-entrant. Additionally, there is another potential use case of "hibernation" of clusters. If a user does not want to use a cluster, then the user should be able to hibernate the cluster. When the user wants to resume the cluster, then the cluster should retain data and state and act as if it was just stopped, but without consuming any resources. This requirement requires isolation of state from the binaries.

For an input/output processing (IOP) cluster, all metadata of various services is in one or more databases. The logs are under /var/logs/ (with the exception of BigSQL).

The mechanism may consolidate all metadata into one database (DB). For now, the metadata for all services (except BigSheets and DB2) are stored in MySQL. BigSheets stores the metadata in an Apache Derby DB in a fixed location. BigSQL stores metadata in DB2 databases.

The mechanism stores the state of the cluster 745 on volumes 750 outside of the containers. In the Docker™ world, storage is typically externalized through volumes. A volume is any directory on the host system that is made accessible to a container just like how a file system is mounted. Thus, the volume is external to a container and persists data beyond a container's lifetime.

To mount a volume in Docker™ run, one must do the following:

docker run -v /host/dir:/container/mydir

The mechanism may use volumes for storing different state entities—metadata, logs, and HDFS data. Following is the placement of logs, metadata, and data.

Master Node
    Volume:
    MySQL tablespace
    BigSQL tablespace
    Derby tablespace
    Volume:
    Namenode data
    Secondary Namenode data
    Volume:
    Logs
    Data Node
    Volume:
    HDFS data Volume:
Logs
Volume:
BigSQL tablespace Then, the mechanism removes all references specific to the golden cluster 740 from the metadata and configurations, resulting in golden volume templates 770, which maintain a pristine state of the cluster 740 that is devoid of any details specific to a particular cluster instance. The mechanism takes snapshots of different volumes containing configuration, metadata, and initial state of the distributed file system and other metadata to generate golden volume templates 770.

Also, the mechanism takes a snapshot of the containers 741, 742 as container images 760. The snapshot results in one image per type of node: master container image 761 and data/slave container image 762, These images 761, 762 are referred to herein as golden cluster images 760.

Figure 8:
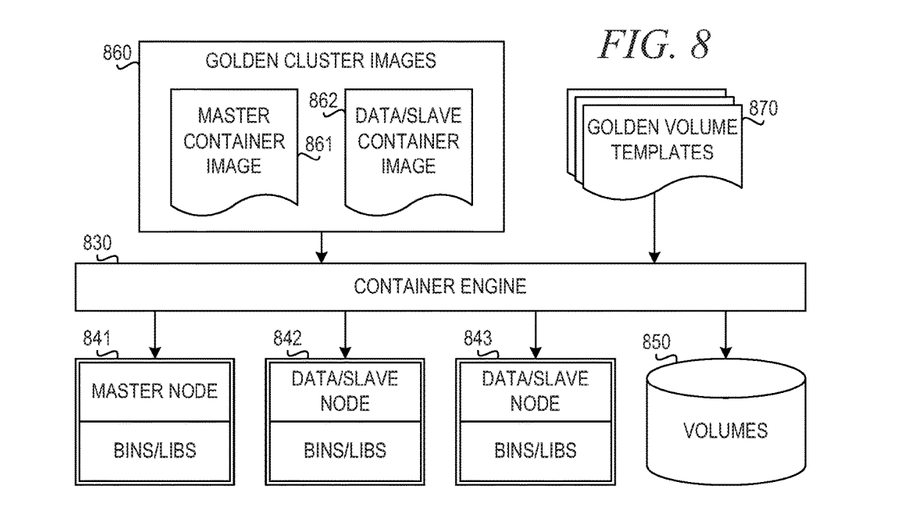
FIG. 8 is a block diagram illustrating a mechanism for provisioning clusters on demand in accordance with an illustrative embodiment.

FIG. 8 is a block diagram illustrating a mechanism for provisioning clusters on demand in accordance with an illustrative embodiment. Container engine 830 receives golden cluster images 860 and golden volume templates 870. In response to receiving a request to create a cluster with specific nodes and a specific service topology, container engine 830 creates a new set of containers based on golden cluster images 860. In the example depicted in FIG. 8, container engine 830 creates master node container 841 from master container image 861 and creates data/slave node containers 842, 843 from data/slave container image 862. Also, container engine 830 clones golden volume templates 870 to form volumes 850 and mounts volumes 850 onto the containers 841, 842, 843. Next, the mechanism recreates configurations based on the cluster request details, such as roles of nodes, size of nodes, and number of nodes. Now, when cluster services are started, the cluster comes alive in a manner of four to five minutes.

In accordance with one embodiment, there may be a plurality of sets of golden cluster images 860 and golden volume templates 870 for various types and roles of nodes.

The mechanism allocates fixed space to each volume so that the mechanism can set a space quota for a cluster's logs, data, and metadata, etc. While a volume looks like a mount point inside a container, it is a mere directory on the host machine's file system. Hence, by creating multiple directories under the same host partition, the mechanism cannot set a quota. One option is to create a partition per volume. While it seems an obvious choice, there are some possible limitations.

The mechanism supports multiple clusters per a large bare metal machine. Even after un-provisioning a cluster, the mechanism may have to keep the volume intact until a grace period is over. Thus, the mechanism does not know upfront how many partitions to create. Then, the mechanism needs to create partitions on the fly when creating or reloading a cluster. However, creating a partition and formatting may take some time, thereby creating cluster creation time overall.

Creating a partition sets aside a fixed space, whether that much is used by the cluster or not.

The mechanism may have to backup metadata and/or data volume/partition, in case the mechanism is to support a bare metal failing.

Considering these limitations, one option is to base the file system on a sparse file, the same technique that Docker™ uses internally for the container file system. A sparse file is a file that attempts to use file system space more efficiently when the file itself is mostly empty. The mechanism creates a very large sparse file, e.g., 20 GB, by filling only zeroes. While it shows the file size as 20 GB upon "ls-l", the sparse file occupies only few bytes initially. As the mechanism adds real data to the sparse file, the file starts occupying the real disk space. It can grow up to the size the mechanism would have defined when creating the sparse file. The sparse file does not grow beyond the specified sparse file size. Linux™ provides another capability to treat any file as a block device and create a file system on it—much like creating a partition.

dd of=my-sp-file bs=1M seek=5120 count=0—Creates a sparse file of 5 GB mkfs.ext3 my-sp-file—Create a file system mkdir test-mount-dir—Create a mount directory mount -o loop my-sp-file test-mount-dir—Mount the file system Making use of the two concepts the mechanism can create a file system from a sparse file to serve the volumes. The sparse file helps in utilizing the disk space efficiently—it occupies only as much disk space as used by the cluster. The sparse file also helps in restricting the maximum size of the volume. Once the mechanism creates a file system using a sparse file and writes contents into the file system, moving the contents is as simple as moving the sparse file. This helps in backup and hibernation as well. Additionally, while creating a new cluster, the mechanism can simply create a new volume needed by the cluster from a master-copy of prepared volume (another sparse file), mount it on a directory and attach it as a volume and bring up container.

Comparing the input/output performance of using sparse file based volumes and partition based volumes, the numbers are comparable. In a few cases, the performance of sparse file was marginally lesser compared to partitions.

Analyzing the pros and cons of both, the mechanism gets far more benefits by going with sparse file based approach.

The sparse files will be placed in the host, where in the host directory they will be mounted, and how the mechanism associates then with clusters are as follows:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firework, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
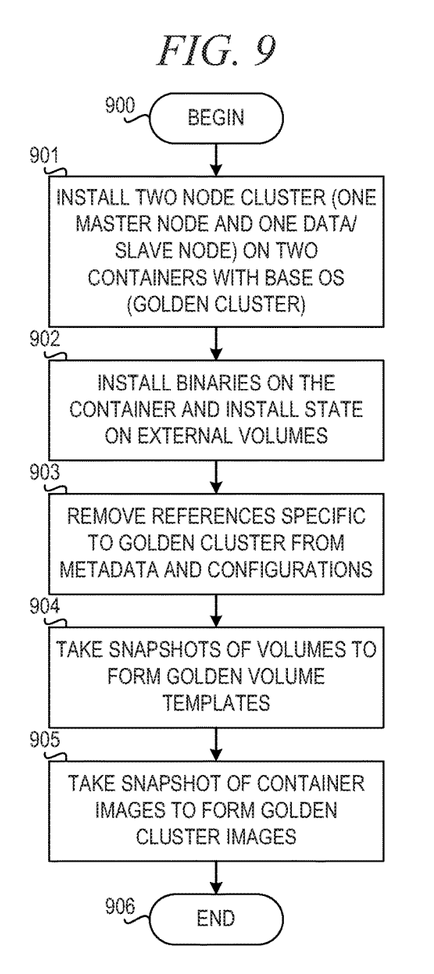
FIG. 9 is a flowchart illustrating operation of a mechanism for creating templates and images for provisioning clusters on demand in accordance with an illustrative embodiment.

FIG. 9 is a flowchart illustrating operation of a mechanism for creating templates and images for provisioning clusters on demand in accordance with an illustrative embodiment. Operation begins (block 900), and the mechanism installs a two-node cluster having one master node and one data/slave node on two containers with a base operating system (block 901), This two-node cluster is referred to herein as the "golden cluster." The mechanism installs binaries and libraries on the container and installs state on external volumes (block 902). The mechanism removes references specific to the golden cluster from metadata and configurations (block 903). The mechanism then takes snapshots of the volumes to form golden volume templates (block 904) and takes snapshots of the container images to form golden cluster images (block 905). Thereafter, operation ends (block 906).

Figure 10:
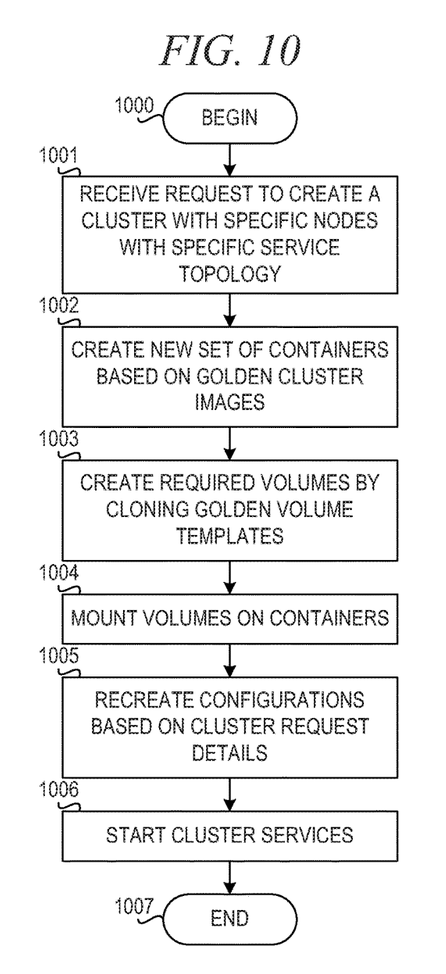
FIG. 10 is a flowchart illustrating operation of a mechanism for provisioning clusters on demand in accordance with an illustrative embodiment.

FIG. 10 is a flowchart illustrating operation of a mechanism for provisioning clusters on demand in accordance with an illustrative embodiment. Operation begins (block 1000), and the mechanism receives a request to create a cluster with specific nodes and specific service topology (block 1001). The mechanism creates a new set of containers based on the golden cluster images (block 1002) and creates required volumes by cloning the golden volume templates (block 1003). The mechanism then mounts the volumes on the new set of containers (block 1004). The mechanism recreates configurations based on the cluster request details (block 1005) and starts cluster services (block 1006). Thereafter, operation ends (block 1007).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having a computer readable program stored therein, wherein the computer readable program, when executed on a computing device, causes the computing device to:
install a cluster on the data processing system, wherein the cluster comprises a master node and a managed node having distributed software installed thereon;
store state of cluster on external volumes;
remove references specific to the cluster from the state of the cluster stored on the external volumes;
take a snapshot of the state of the cluster stored on the external volumes to form a set of volume templates;
take a snapshot of images of the master node and the managed node to form a set of node type images; and
responsive to receiving a request to create a specified cluster, create a new set of nodes on the data processing system based on the set of node type images, clone the set of volume templates to form a new set of volumes in the data processing system, mount the new set of volumes to the new set of nodes, and recreate configurations based on details in the request,
wherein cloning the set of volume templates comprises allocating fixed space to each volume, setting a space quota for logs, data, and metadata, and creating a file system from a sparse file to serve as the volumes.

2. The computer program product of claim 1, wherein the computer readable program further causes the computing device to start cluster services for the specified cluster.

3. The computer program product of claim 1, wherein installing the cluster comprises installing binaries and libraries in the master node and the managed node.

4. The computer program product of claim 1, wherein the state of the cluster comprises configurations, metadata, and initial distributed file system state.

5. The computer program product of claim 1, wherein the request specifies roles of nodes, size of nodes, and number of nodes.

6. An apparatus comprising:
a processor; and
a memory coupled to the processor, wherein the memory comprises instructions which, when executed by the processor, cause the processor to:
installing a cluster on the data processing system, wherein the cluster comprises a master node and a managed node having distributed software installed thereon;
storing state of cluster on external volumes;
removing references specific to the cluster from the state of the cluster stored on the external volumes;
taking a snapshot of the state of the cluster stored on the external volumes to form a set of volume templates;
taking a snapshot of images of the master node and the managed node to form a set of node type images; and
responsive to receiving a request to create a specified cluster, creating a new set of nodes on the data processing system based on the set of node type images, cloning the set of volume templates to form a new set of volumes in the data processing system, mounting the new set of volumes to the new set of nodes, and recreating configurations based on details in the request,
wherein cloning the set of volume templates comprises allocating fixed space to each volume, setting a space quota for logs, data, and metadata, and creating a file system from a sparse file to serve as the volumes.

7. The apparatus of claim 6, further comprising starting cluster services for the specified cluster.

8. The apparatus of claim 6, wherein installing the cluster comprises installing binaries and libraries in the master node and the managed node.

9. The apparatus of claim 6, wherein the state of the cluster comprises configurations, metadata, and initial distributed file system state.

10. The apparatus of claim 6, wherein the request specifies roles of nodes, size of nodes, and number of nodes.

\* \* \* \* \*